(12) United States Patent
Guha et al.

(10) Patent No.: US 10,203,998 B2
(45) Date of Patent: Feb. 12, 2019

(54) AUTOMATIC ANALYSIS OF A SET OF SYSTEMS USED TO IMPLEMENT A PROCESS

(71) Applicant: Accenture Global Solutions Limited, Dublin (IE)

(72) Inventors: Arindam Guha, Wethersfield, CT (US); Amit Jindal, Palo Alto, CA (US); Margaret Hughes, South San Francisco, CA (US); Kelsey Marie Gohn, San Francisco, CA (US)

(73) Assignee: Accenture Global Solutions Limited, Dublin (IE)

( * ) Notice: Subject to any disclaimer, the term of this patent is extended or adjusted under 35 U.S.C. 154(b) by 177 days.

(21) Appl. No.: 15/439,403

(22) Filed: Feb. 22, 2017

(65) Prior Publication Data

US 2018/0239660 A1  Aug. 23, 2018

(51) Int. Cl.
*G06F 11/00* (2006.01)
*G06F 11/07* (2006.01)
*G06Q 40/08* (2012.01)

(52) U.S. Cl.
CPC ........ *G06F 11/0709* (2013.01); *G06F 11/079* (2013.01); *G06F 11/0751* (2013.01); *G06F 11/0793* (2013.01); *G06Q 40/08* (2013.01)

(58) Field of Classification Search
CPC .................................................. G06F 11/0709
USPC ...... 714/37, 36, 4.3, 4.4, 4.21, 38.1, 47.1, 2, 714/4.1
See application file for complete search history.

(56) References Cited

U.S. PATENT DOCUMENTS

| | | | |
|---|---|---|---|
| 5,568,605 A * | 10/1996 | Clouston | H04L 41/046 709/224 |
| 2006/0059253 A1 | 3/2006 | Goodman et al. | |
| 2006/0064486 A1 * | 3/2006 | Baron | H04L 41/0886 709/224 |
| 2008/0262887 A1 | 10/2008 | Guthrie | |
| 2012/0089410 A1 | 4/2012 | Mikurak | |
| 2012/0287795 A1 * | 11/2012 | Mohan | H04L 43/10 370/241.1 |
| 2013/0151691 A1 | 6/2013 | Etgen et al. | |

OTHER PUBLICATIONS

Wikipedia, "Black-box testing," https://en.wikipedia.org/wiki/Black-box_testing, Jan. 2, 2017, 2 pages.

* cited by examiner

*Primary Examiner* — Dieu Minh T Le
(74) *Attorney, Agent, or Firm* — Harrity & Harrity, LLP

(57) ABSTRACT

A device may receive first data associated with a set of systems used to implement a process. The device may determine a system topology for the set of systems. The device may identify a set of control points associated with the set of systems. The set of control points may include a set of points in the system topology where second data is received or provided by the set of systems. The second data may include information to be used by the set of systems during the process. The device may identify a set of values for a set of metrics related to the set of systems. The set of values may be identified based on the first data. The device may identify an error related to the set of control points or the set of metrics. The device may perform an action to facilitate fixing of the error.

20 Claims, 6 Drawing Sheets

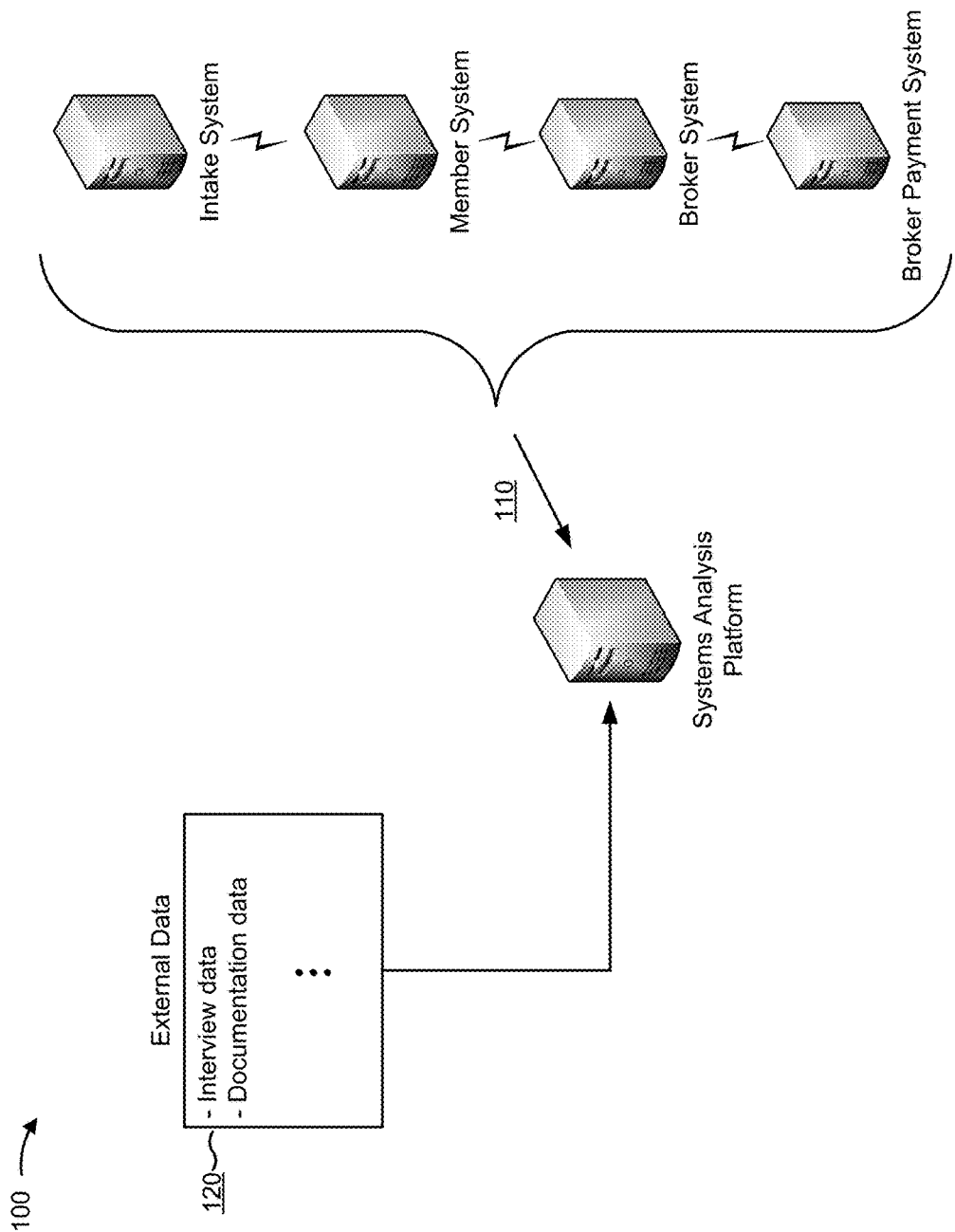

AUTOMATIC ANALYSIS OF A SET OF SYSTEMS USED TO IMPLEMENT A PROCESS

BACKGROUND

A process may include a set of interrelated activities that interact to achieve a result. For example, a process may relate to enrollment of a consumer in a health insurance plan and reimbursement of a broker who helped the consumer to enroll in the health insurance plan. A result of the process may be affected by a structure and/or organization of the process. For example, a process to enroll a consumer in a health insurance plan may include interaction with various web-based systems associated with an organization providing the health insurance plan. In this example, data, related to the interactions of the consumer and/or the broker with the various systems, may be collected.

SUMMARY

According to some possible implementations, a device may include one or more processors to receive first data associated with a set of systems used to implement a process. The first data may include information related to an operation or a performance of the set of systems. The one or more processors may determine a system topology for the set of systems based on receiving the first data. The one or more processors may identify a set of control points associated with the set of systems based on determining the system topology. The set of control points may include a set of points in the system topology where second data is received or provided by the set of systems. The second data may include information to be used by the set of systems during the process. The one or more processors may identify a set of values for a set of metrics related to the set of systems based on identifying the set of control points. The set of values may be identified based on the first data. The one or more processors may identify an error related to the set of control points or the set of metrics based on identifying the set of control points or the set of values. The one or more processors may perform an action to facilitate fixing of the error based on identifying the error.

According to some possible implementations, a method may include receiving, by a device, first data associated with multiple systems used to implement a process. The first data may be received from the multiple systems or from another device associated with the multiple systems. The method may include storing, by the device, the first data in one or more storage devices associated with the device. The method may include determining, by the device, a system topology for the multiple systems based on storing the first data. The system topology may identify a quantity of systems included in the multiple systems, a type of the systems included in the multiple systems, or a manner in which the multiple systems are interconnected. The method may include identifying, by the device, multiple control points associated with the multiple systems based on determining the system topology. The multiple control points may include points of connection among the multiple systems. The method may include identifying, by the device, multiple values for multiple metrics related to the multiple systems based on identifying the multiple control points. The multiple values may be identified based on the first data. The method may include identifying, by the device, multiple errors related to the multiple control points or the multiple metrics based on identifying the multiple control points or the multiple values. The method may include performing, by the device, multiple actions to facilitate fixing of the multiple errors based on identifying the multiple errors.

According to some possible implementations, a non-transitory computer-readable medium may store one or more instructions that, when executed by one or more processors, cause the one or more processors to receive first data associated with one or more systems used to implement one or more processes. The first data may be received from the one or more systems. The one or more instructions, when executed by the one or more processors, may cause the one or more processors to determine a system topology for the one or more systems based on the first data. The one or more instructions, when executed by the one or more processors, may cause the one or more processors to identify one or more control points associated with the one or more systems based on determining the system topology. The one or more control points may be associated with second data to be used by the one or more systems when implementing the one or more processes. The one or more instructions, when executed by the one or more processors, may cause the one or more processors to identify one or more values for one or more metrics related to the one or more systems based on identifying the one or more control points. The one or more values may be identified based on the first data. The one or more instructions, when executed by the one or more processors, may cause the one or more processors to identify one or more errors related to the one or more control points or the one or more metrics based on identifying the one or more control points or the one or more values. The one or more errors may negatively impact an operation or a performance of the one or more systems. The one or more instructions, when executed by the one or more processors, may cause the one or more processors to perform one or more actions to positively impact the one or more errors based on identifying the one or more errors.

BRIEF DESCRIPTION OF THE DRAWINGS

FIGS. 1A-1C are diagrams of an overview of an example implementation described herein;

DETAILED DESCRIPTION

The following detailed description of example implementations refers to the accompanying drawings. The same reference numbers in different drawings may identify the same or similar elements.

An organization may implement various processes to conduct operations of the organization. The organization may use various computer-based systems to implement the various processes. In some cases, the systems may have been developed and/or tested independently. In addition, there may be a lack of controls between the systems. This can result in data loss, data leakage, system errors, data corruption, data incompatibilities, reduced accuracy of system output, and/or the like during implementation of the various processes.

Implementations described herein enable a systems analysis platform to generate a system topology of systems used to implement a process. Furthermore, implementations described herein enable a systems analysis platform to identify sources of data loss, data leakage, or other issues that have occurred, or might occur, during implementation of the process. Furthermore, implementations described herein enable a systems analysis platform to generate predictions or recommendations and/or perform other actions to improve the process.

In this way, the systems analysis platform increases an efficiency of analyzing a process of an organization, thereby conserving processing resources via quick and efficient analysis of systems used to implement the process. In addition, in this way, the systems analysis platform improves accuracy of a result/output of a process, thereby conserving processing resources that would be consumed due to inaccurate results/outputs. Furthermore, in this way, the systems analysis platform improves data communicated between systems used to implement a process, thereby conserving processing resources that would otherwise be consumed as a result of damaged, corrupted, or incorrect data.

Figure 1B:
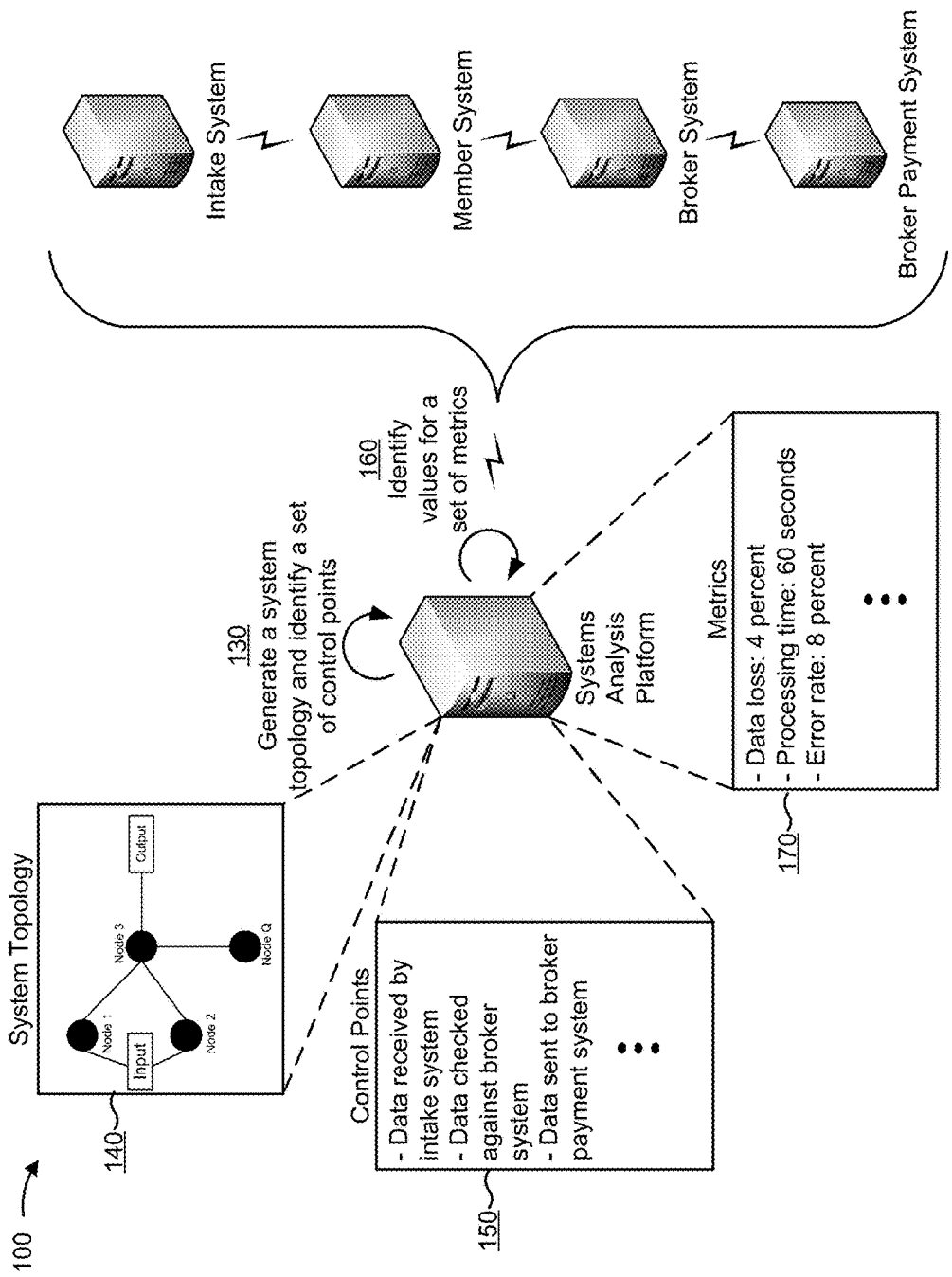
Figure 1C:
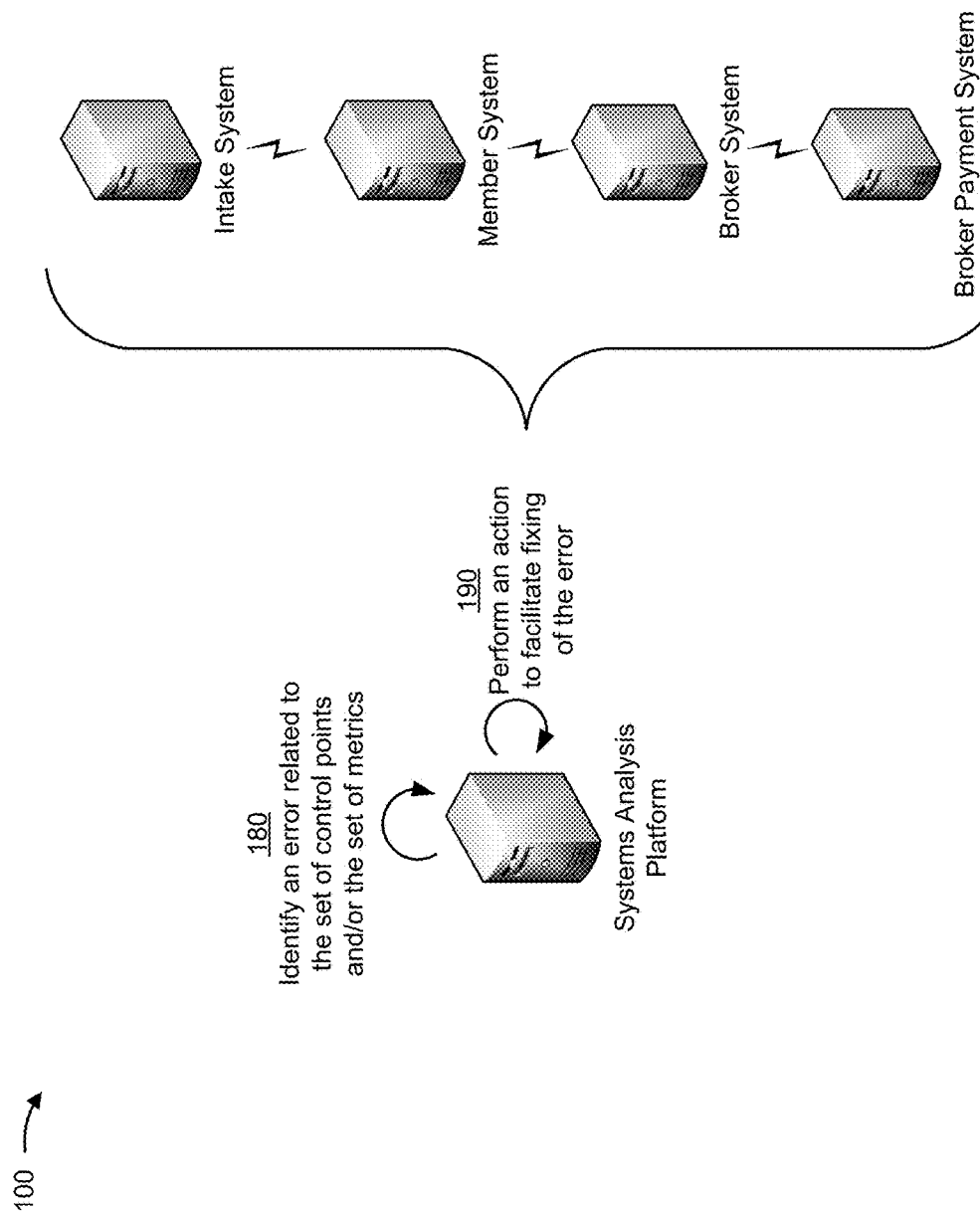

FIGS. 1A-1C are diagrams of an overview of an example implementation 100 described herein. Example implementation 100 may relate to examining systems that implement a process to enroll consumers in a health insurance plan and reimburse a broker that assisted with the enrollment. For example, the examined systems may implement the process utilizing an intake system used to receive consumer information during the enrollment process, a member system used to store/manage the consumer's information after enrollment, a broker system used to store data related to licensed brokers that work with an insurance company providing the health insurance plan, and a broker payment system used to determine and/or administer broker reimbursement payments for each consumer enrollment.

As shown in FIG. 1A, and by reference number 110, a systems analysis platform may receive data associated with a set of systems used to implement a process. For example, the data may include data received directly from the set of systems being analyzed, such as data related to a quantity of systems used, a type of systems used, a manner in which the systems are interconnected, and/or the like. As shown by reference number 120, the systems analysis platform may receive external data, such as interview data related to interviews of people with experience interacting with the set of systems, and documentation data related to implementation of the set of systems, such as data validation/formatting rules associated with the set of systems, user documentation associated with the set of systems, and/or the like. The systems analysis platform may process the data (e.g., external data or data received from the set of systems). In some cases, when the data includes text or other language based elements, the systems analysis platform may use a rule-based and/or metadata-based language processing technique to process unstructured, or structured, natural language data.

As shown in FIG. 1B, and by reference number 130, the systems analysis platform may generate a system topology and identify a set of control points for the set of systems. For example, the systems analysis platform may determine that the consumer enrollment and broker reimbursement process includes an intake system, a member system, a broker system, and a broker payment system, and may determine the manner in which the systems are interconnected. In addition, for example, the systems analysis platform may identify points within or between the set of systems where the set of systems receive data, where the received data needs to be in a particular format, is to be validated, and/or the like.

As further shown in FIG. 1B, and by reference number 140, the system topology generated by the systems analysis platform may show a point for a set of systems, or a corresponding process, that receives input, a point where the set of systems, or the corresponding process, generates output, and one or more nodes associated with the set of systems, or the corresponding process, shown as node 1 through node Q. The nodes shown by the system topology may represent systems of the set of systems, steps of a process that the set of systems implements, and/or a set of control points that the set of systems identified.

In some cases, the systems analysis platform may identify a set of control points based on black-box testing or analysis. For example, the systems analysis platform may not have access to internal operations and/or processing logic associated with the systems, subsystems, or modules making up a set of systems or an overall system.

Additionally, or alternatively, the systems analysis platform may use an adaptive model to optimize the quantity, and/or location within the set of systems, of control points. For example, the systems analysis platform may identify a quantity of control points, and/or location of the control points, needed to satisfy a threshold metric, performance indicator, and/or the like. Continuing with the previous example, the systems analysis platform may remove identified control points, and/or modify the location of the identified control points, in a progressive manner until the performance/operation of the set of systems fails to satisfy a threshold metric, performance indicator, and/or the like. In this way, the systems analysis platform may optimize a quantity, and/or location, of control points for a set of systems.

Reference number 150 shows example control points in the process that the systems analysis platform may identify. For example, the systems analysis platform may identify control points where data is received by the intake system (e.g., via a user interface associated with the intake system), where data from the intake system is validated against a broker system (e.g., using a data structure associated with the broker system), where data is provided from the intake system to the broker payment system, and/or the like.

As shown by reference number 160, the systems analysis platform may identify values for a set of metrics related to the set of systems. For example, the systems analysis platform may identify values for metrics related to performance of the set of systems, processes implemented by the set of systems, operations of the set of systems, and/or the like. As shown by reference number 170, the metrics may relate to, for example, data loss of the set of systems, processing time of the set of systems, an error rate of the set of systems, and/or the like.

As shown in FIG. 1C, and by reference number 180, the systems analysis platform may identify an error related to the set of control points and/or the set of metrics. For example, the systems analysis platform may identify a missing control point (e.g., based on documentation data, data related to another set of systems, etc.), such as a lack of validation of formatting of data provided from one system to another system. As another example, the systems analysis platform may identify a value of a metric that satisfies a first threshold value rather than a second threshold value, or does not satisfy a third threshold value.

As shown by reference number 190, the systems analysis platform may perform an action to facilitate fixing of the error. For example, the systems analysis platform may generate a recommendation to implement validation of formatting between systems. As another example, the systems analysis platform may generate a report that identifies sources of data loss and/or data leakage as data is exchanged among the set of systems.

In this way, the systems analysis platform increases an efficiency of analyzing a process of an organization, thereby conserving processing resources via quick and efficient analysis of systems used to implement the process. Furthermore, in this way, the systems analysis platform improves accuracy of a result/output of a process, thereby conserving processing resources that would be consumed due to inaccurate results/outputs. Furthermore, in this way, the systems analysis platform improves data communicated between systems, thereby conserving processing resources that would otherwise be consumed as a result of damaged, corrupted, or incorrect data.

As indicated above, FIG. 1A-1C are provided merely as an example. Other examples are possible and may differ from what was described with regard to FIG. 1A-1C. For example, other examples may include additional or different systems than those shown in FIGS. 1A-1C. In addition, other examples may relate to processes other than a process for consumer enrollment in a health insurance plan and/or reimbursement of a broker, may relate to organizations other than an insurance company, and/or the like.

Figure 2:
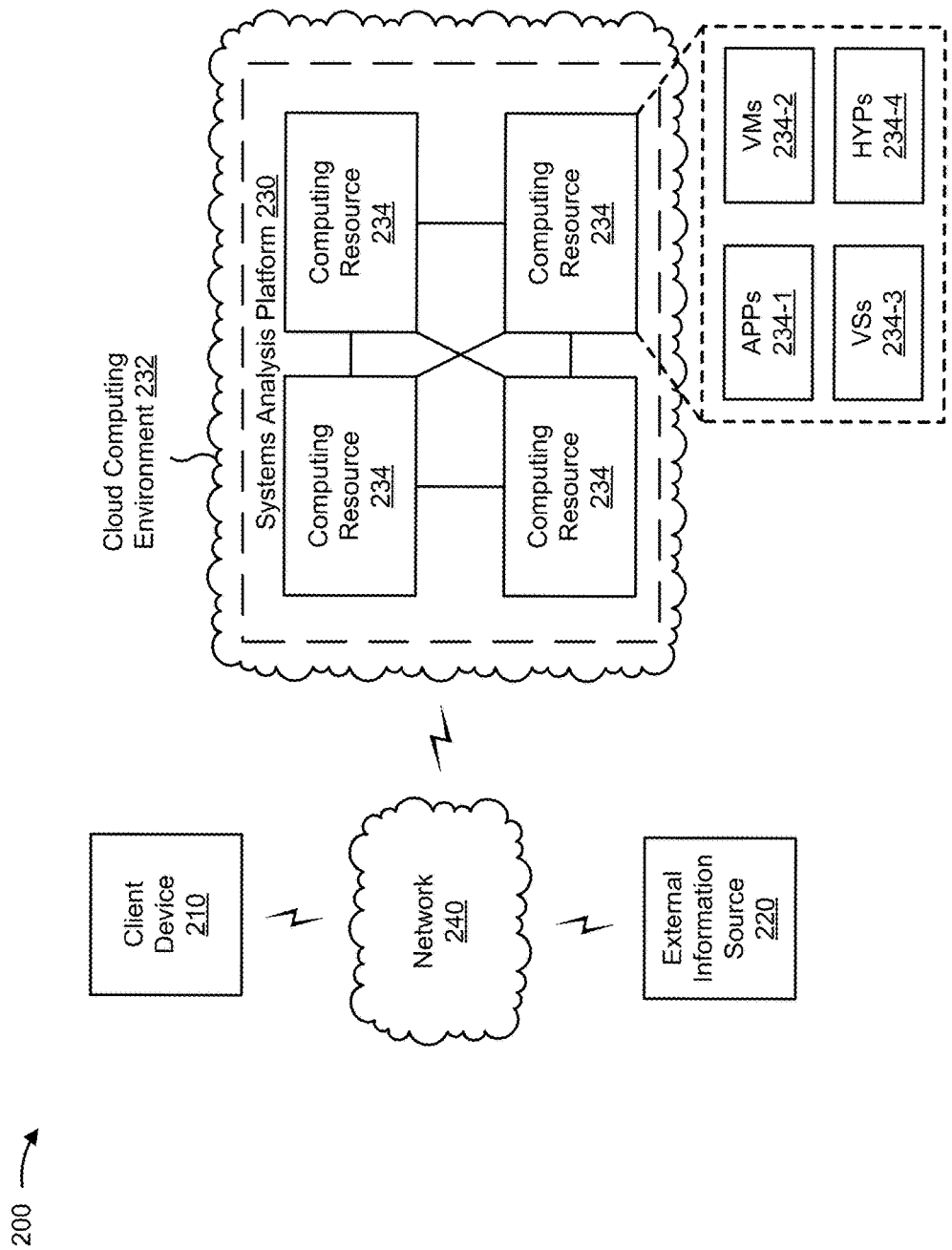
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, an external information source 220, a systems analysis platform 230, a cloud computing environment 232, a set of computing resources 234 (hereinafter referred to collectively as "computing resources 234" and individually as "computing resource 234"), and a network 240. Devices of environment 200 may interconnect via wired connections, wireless connections, or a combination of wired and wireless connections.

Client device 210 includes one or more devices capable of receiving, generating, storing, processing, and/or providing information associated with a set of systems used to implement a process. For example, client device 210 may include a desktop computer, a mobile phone (e.g., a smart phone or a radiotelephone), a laptop computer, a tablet computer, a gaming device, a wearable communication device (e.g., a smart wristwatch or a pair of smart eyeglasses), or a similar type of device. In some implementations, client device 210 may provide information to systems analysis platform 230 (e.g., to permit systems analysis platform 230 to analyze a set of systems), as described elsewhere herein. Additionally, or alternatively, client device 210 may receive information identifying a result of analyzing a set of systems (e.g., from systems analysis platform 230), as described elsewhere herein.

External information source 220 includes one or more devices capable of receiving, providing, storing, generating, and/or processing information associated with a set of systems used to implement a process. For example, external information source 220 may include a server (e.g., in a data center or a cloud computing environment), a data center (e.g., a multi-server micro data center), a workstation computer, a virtual machine (VM) provided in a cloud computing environment, a user device, or a similar type of device. In some implementations, external information source 220 may store information associated with a set of systems to be analyzed by systems analysis platform 230, as described elsewhere herein. Additionally, or alternatively, external information source 220 may provide information associated with a set of systems to be analyzed to systems analysis platform 230, as described elsewhere herein.

Cloud computing environment 232 includes an environment that hosts systems analysis platform 230. Cloud computing environment 232 may provide computation, software, data access, storage, etc. services that do not require end-user (e.g., client device 210) knowledge of a physical location and configuration of system(s) and/or device(s) that host systems analysis platform 230. As shown, cloud computing environment 232 may include a group of computing resources 234 (referred to collectively as "computing resources 234" and individually as "computing resource 234").

Computing resource 234 includes one or more personal computers, workstation computers, server devices, or other types of computation and/or communication devices. In some implementations, computing resource 234 may host systems analysis platform 230. The cloud resources may include compute instances executing in computing resource 234, storage devices provided in computing resource 234, data transfer devices provided by computing resource 234, etc. In some implementations, computing resource 234 may communicate with other computing resources 234 via wired connections, wireless connections, or a combination of wired and wireless connections.

As further shown in FIG. 2, computing resource 234 may include a group of cloud resources, such as one or more applications ("APPs") 234-1, one or more virtual machines ("VMs") 234-2, one or more virtualized storages ("VSs") 234-3, or one or more hypervisors ("HYPs") 234-4.

Application 234-1 includes one or more software applications that may be provided to or accessed by one or more devices of environment 200. Application 234-1 may eliminate a need to install and execute the software applications on devices of environment 200. For example, application 234-1 may include software associated with systems analysis platform 230 and/or any other software capable of being provided via cloud computing environment 232. In some implementations, one application 234-1 may send/receive information to/from one or more other applications 234-1, via virtual machine 234-2.

Virtual machine 234-2 includes a software implementation of a machine (e.g., a computer) that executes programs like a physical machine. Virtual machine 234-2 may be either a system virtual machine or a process virtual machine, depending upon use and degree of correspondence to any real machine by virtual machine 234-2. A system virtual machine may provide a complete system platform that supports execution of a complete operating system ("OS"). A process virtual machine may execute a single program, and may support a single process. In some implementations, virtual machine 234-2 may execute on behalf of a user (e.g., a user of client device 210), and may manage infrastructure of cloud computing environment 232, such as data management, synchronization, or long-duration data transfers.

Virtualized storage 234-3 includes one or more storage systems and/or one or more devices that use virtualization techniques within the storage systems or devices of computing resource 234. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored.

This may enable optimization of storage use, server consolidation, and/or performance of non-disruptive file migrations.

Hypervisor 234-4 may provide hardware virtualization techniques that allow multiple operating systems (e.g., "guest operating systems") to execute concurrently on a host computer, such as computing resource 234. Hypervisor 234-4 may present a virtual operating platform to the guest operating systems, and may manage the execution of the guest operating systems. Multiple instances of a variety of operating systems may share virtualized hardware resources.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of advanced generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
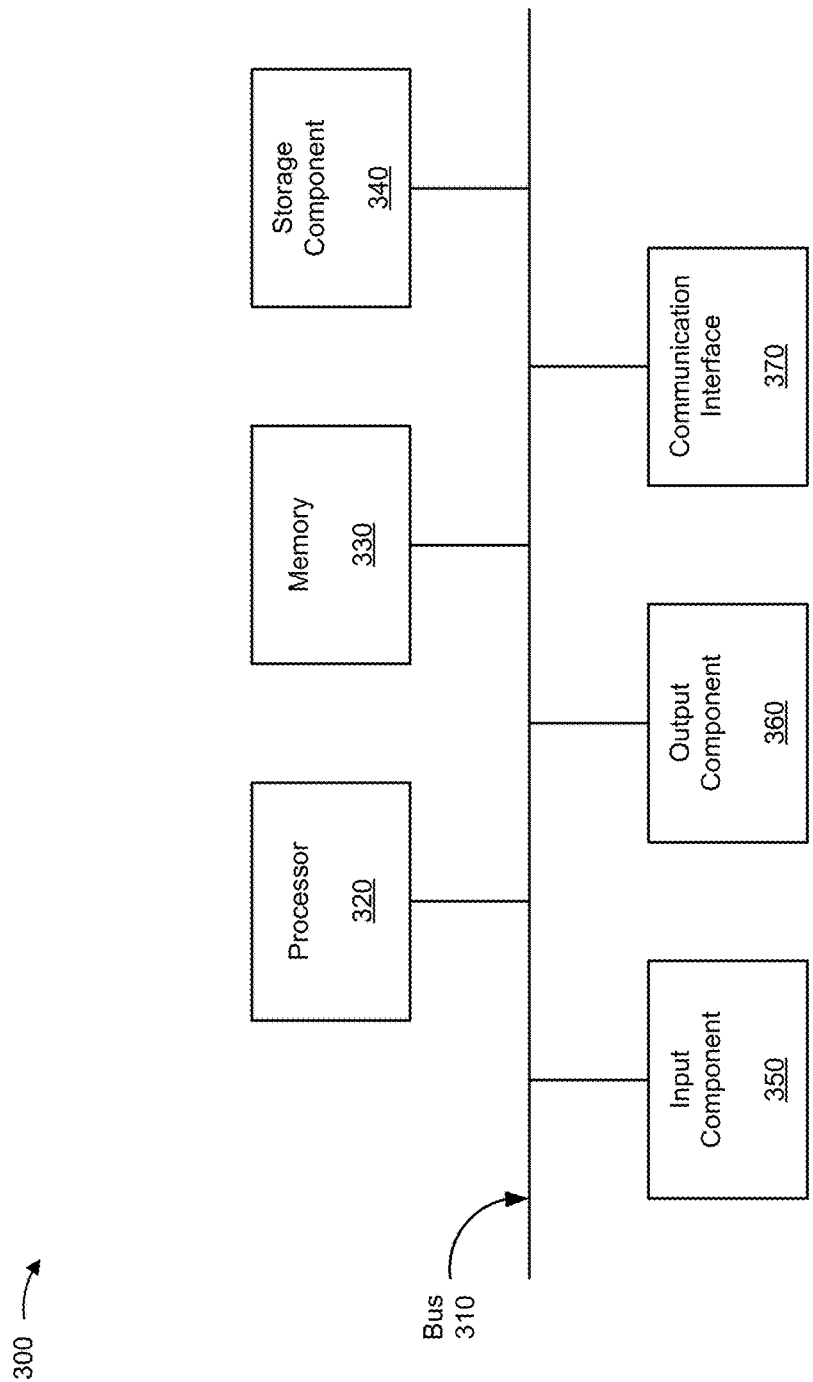
FIG. 3 is a diagram of example components of one or more devices of FIG. 2.

FIG. 3 is a diagram of example components of a device 300. Device 300 may correspond to client device 210, external information source 220, systems analysis platform 230, and/or computing resource 234. In some implementations, client device 210, external information source 220, systems analysis platform 230, and/or computing resource 234 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
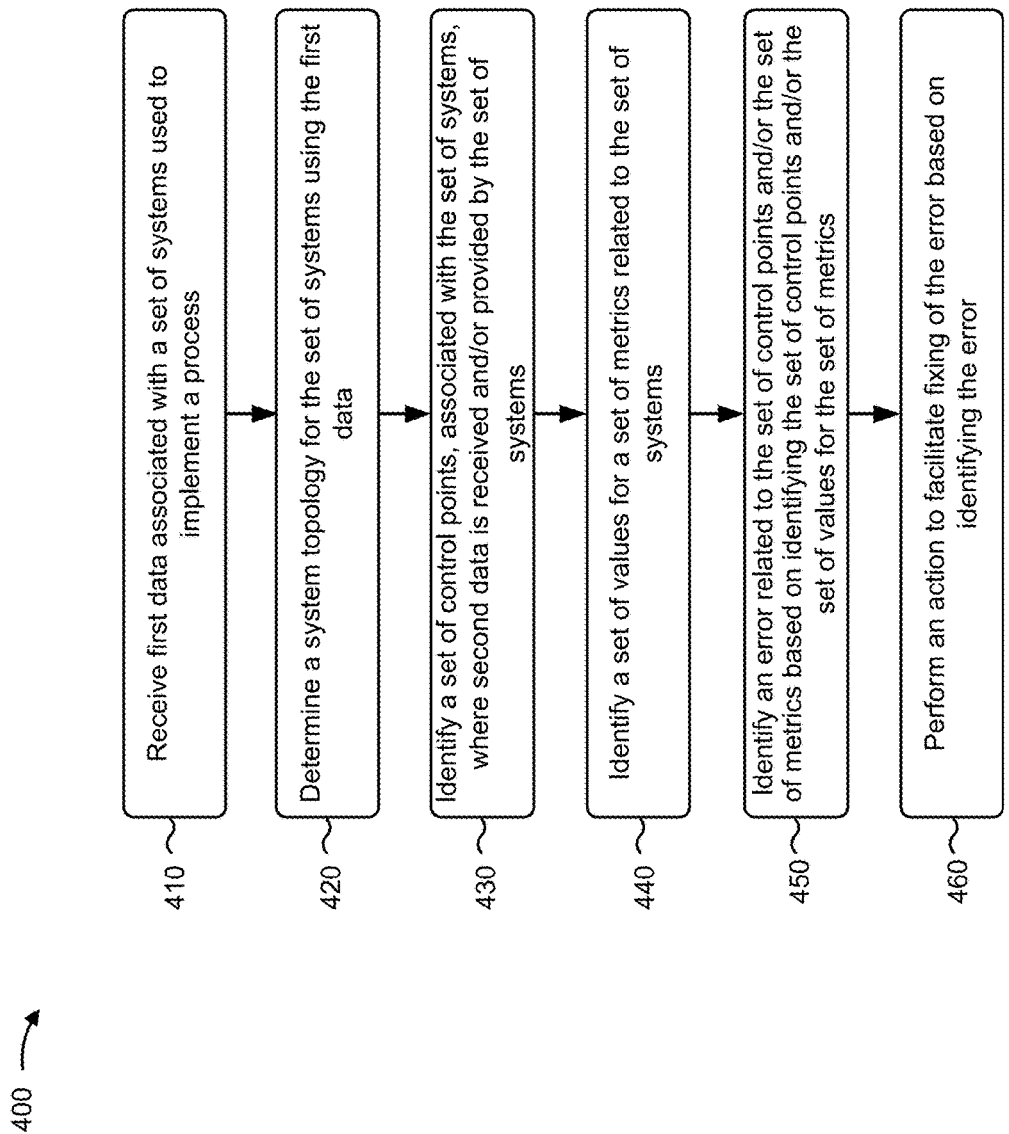
FIG. 4 is a flow chart of an example process for automatic analysis of a set of systems used to implement a process.

FIG. 4 is a flow chart of an example process 400 for automatic analysis of a set of systems used to implement a process. In some implementations, one or more process blocks of FIG. 4 may be performed by systems analysis platform 230. In some implementations, one or more process blocks of FIG. 4 may be performed by another device or a group of devices separate from or including systems analysis platform 230, such as client device 210 and external information source 220.

As shown in FIG. 4, process 400 may include receiving first data associated with a set of systems used to implement a process (block 410). For example, systems analysis platform 230 may receive first data associated with a set of systems used to process second data. In some implementations, systems analysis platform 230 may receive the first data from client device 210 and/or external information source 220. In some implementations, systems analysis platform 230 may receive the first data periodically, according to a schedule, based on user input, based on requesting the first data, and/or the like.

In some implementations, the set of systems may include a set of systems used by an organization to implement a process. For example, an insurance company may use various systems to enroll consumers in an insurance plan and to reimburse a broker for assisting the consumer with enrolling (e.g., a consumer enrollment and broker reimbursement process). In this case, the various systems may include an intake system, a member management system, a broker system, and/or a broker payment system.

In some implementations, the first data may include information related to the set of systems used to implement a process, an operation of the set of systems, a performance of the set of systems, and/or the like. In some implementations, the first data may identify a quantity and/or the types of systems used to implement a process. For example, for a consumer enrollment and broker reimbursement process, the first data may identify an intake system, a member system, a broker payment system, an amount of time each of those systems takes to perform actions related to the process, and/or the like. In some implementations, the set of systems may use another type of data during implementation of the process, as described elsewhere herein. For example, the set of systems may use second data (e.g., received via a user interface), may store second data, may output second data, and/or the like.

Additionally, or alternatively, the first data may include output from the set of systems related to implementation of the process. For example, for a consumer enrollment and broker reimbursement process, the first data may include a report generated by the set of systems that identifies a quantity of consumers that a broker helped enroll, an amount due to the broker, and/or the like.

Additionally, or alternatively, the first data may identify metrics and/or a value of the metrics associated with the set of systems and/or a process implemented by the set of systems. For example, for a consumer enrollment and broker reimbursement process, the first data may identify a quantity of consumers enrolled in a health insurance plan, a quantity of consumers that submitted information via an intake system (e.g., for comparison to a quantity enrolled to identify a processing error), a quantity and/or types of errors generated during implementation of the process, a processing time of the set of systems from input of second data to output, and/or the like.

Additionally, or alternatively, the first data may include text or responses to a questionnaire or a survey. For example, employees of an insurance company, brokers, and/or consumers enrolling in a health insurance plan may fill out a questionnaire or survey regarding issues or an experience using the set of systems, and the first data may include responses to the questionnaire or the survey. Additionally, or alternatively, the first data may include a document that includes text (e.g., a text file, a text document, a web document, such as a webpage, or a file that includes text), a group of documents that includes text, a portion of a document that includes text, and/or the like.

Additionally, or alternatively, the first data may include text or audio from an interview. For example, similar to the questionnaire example above, an employee, a broker, and/or a consumer may have been interviewed regarding their experience or issues using the set of systems and the text may include notes and/or a transcript of the interview.

Additionally, or alternatively, the first data may include text or other documentation related to types of systems used to implement a process, types of second data used by the set of systems, formatting rules for second data used by each system included in the set of systems, data validation rules/procedures associated with the set of systems, procedures for violations of formatting or validation rules, and/or the like. For example, the text may include a user guide associated with the set of systems, a requirements/specification document associated with the set of systems, and/or the like.

In some implementations, systems analysis platform 230 may perform a test of the set of systems to receive the first data. For example, systems analysis platform 230 may perform a test to determine performance of the set of systems, to determine data flows via the set of systems, and/or the like. In some implementations, and for example, systems analysis platform 230 may input tagged second data into a particular system (e.g., an intake system) to determine a manner in which the second data is processed by the set of systems. As a particular example, systems analysis platform 230 may determine to which systems (and in which order) the second data is sent, how the second data is processed by the systems, the format of the second data sent between systems included in the set of systems, and/or the like. In some implementations, systems analysis platform 230 may receive first data that identifies a manner in which the set of systems handled the input second data (e.g., whether the set of systems processed the second data, dropped the second data, generated an error based on the second data, etc.). In this way, systems analysis platform 230 may test a set of systems to receive the first data and/or identify a data flow via the set of systems.

Additionally, or alternatively, systems analysis platform 230 may generate second data according to various formats and may receive first data related to the manner in which the set of systems processed the second data after inputting the second data into the set of systems. For example, the first data may identify whether the set of systems accepted the second data, generated an error based on the second data, and/or the like. Continuing with the previous example, and assuming the set of systems includes an intake system that needs second data identifying a date, systems analysis platform 230 may generate a date according to various formats, such as "01/31/2016," "31/01/2016," "January 31, 2016," "01-31-2016," "01.31.2016," and/or the like. Continuing with the previous example, systems analysis platform 230 may input the generated date into a data field of a user interface of the intake system and receive first data indicating whether each of the differently formatted dates were accepted by the intake system and/or caused an error to be generated. In this way, systems analysis platform 230 may determine functioning of the set of systems and, for example, a manner in which the set of systems handles second data according to various formats.

In some implementations, when testing the set of systems, systems analysis platform 230 may perform integrated testing. For example, systems analysis platform 230 may test multiple systems and the manner in which the multiple systems interconnect (e.g., rather than testing one system at a time). This improves first data that systems analysis platform 230 receives as a result of testing the set of systems and improves identification of an error related to the set of systems.

In some implementations, systems analysis platform 230 may receive at least some of the first data based on processing text. For example, text may include a text document, a web page, a transcript of an interview, audio converted to text (e.g., using automatic speech recognition (ASR), computer speech recognition, speech-to-text, etc.), and/or the like. In some implementations, systems analysis platform 230 may process the first data using natural language processing, computational linguistics, text analysis, and/or the like. For example, systems analysis platform 230 may process text to identify a set of characters, such as a single character, multiple characters (e.g., a character string), a combination of characters that form multiple words (e.g., a multi-word term, such as a phrase, a sentence, or a paragraph), a combination of characters that form an acronym, a combination of characters that form an abbreviation of a word, or a combination of characters that form a misspelled word, included in the first data.

In some implementations, systems analysis platform 230 may process the text using information and/or instructions for identifying a term in the text. For example, systems analysis platform 230 may use a tag list that identifies tags (e.g., part-of-speech tags or user-input tags) to be used to identify a term in the text. As another example, systems analysis platform 230 may use a term list (e.g., a glossary that identifies terms in the text, a dictionary that includes term definitions, a thesaurus that includes term synonyms or antonyms, or a lexical database, such as WordNet, that identifies a term in the text (e.g., a single-word term and/or a multi-word term)).

In some implementations, when processing the text, systems analysis platform 230 may prepare the text for processing. For example, systems analysis platform 230 may standardize the text to prepare the text for processing. In some implementations, preparing the text for processing may include adjusting characters, such as by removing characters, replacing characters, adding characters, adjusting a font, adjusting formatting, adjusting spacing, removing white space (e.g., after a beginning quotation mark, before an ending quotation mark, before or after a range indicator, such as a hyphen dash, or a colon, or before or after a punctuation mark, such as a percentage sign). For example, systems analysis platform 230 may replace multiple spaces with a single space, may insert a space after a left parenthesis, a left brace, or a left bracket, or may insert a space before a right parenthesis, a right brace, or a right bracket. In this way, systems analysis platform 230 may use a space delimiter to more easily parse the text.

In some implementations, systems analysis platform 230 may prepare the text for processing by expanding acronyms in the text. For example, systems analysis platform 230 may replace a short-form acronym, in text, with a full-form term that the acronym represents (e.g., may replace "EPA" with "Environmental Protection Agency"). Systems analysis platform 230 may determine the full-form term of the acronym by, for example, using a glossary or other input text, searching the text for consecutive words with beginning letters that correspond to the acronym (e.g., where the beginning letters "ex" may be represented in an acronym by "X") to identify a potential full-form term of an acronym, or by searching for potential full-form terms that appear near the acronym in the text (e.g., within a threshold quantity of words). Additionally, or alternatively, systems analysis platform 230 may search the Internet for an acronym and then use a context of the text to identify relevant results of the search. For example, systems analysis platform 230 may form a search query using the acronym, search the Internet using the search query, and rank the results of the search based on the context of the text (e.g., as identified by terms included in the text, a source of the text, etc.).

In some implementations, systems analysis platform 230 may prepare the text for processing by replacing characters and/or symbols with one or more terms. For example, systems analysis platform 230 may replace an "@" symbol in text with the term "at." In some implementations, when systems analysis platform 230 replaces a character and/or symbol, systems analysis platform 230 may add leading and/or trailing spaces. For example, systems analysis platform 230 may process the text "@Paris airport" to form the text "at the Paris airport."

In some implementations, systems analysis platform 230 may associate a tag with a word included in the text (e.g., based on a tag association rule). In some implementations, the tag association rule may specify a manner in which the tag is to be associated with a word, or based on characteristics of the word. For example, a tag association rule may specify that a singular noun tag ("/NN") is to be associated with words that are singular nouns (e.g., based on a language database or a context analysis). In some implementations, a tag may include a part-of-speech (POS) tag, such as NN (noun, singular or mass), NNS (noun, plural), NNP (proper noun, singular), NNPS (proper noun, plural), VB (verb, base form), VBD (verb, past tense), VBG (verb, gerund or present participle), and/or the like.

In some implementations, a word may refer to a unit of language that includes one or more characters. A word may include a dictionary word (e.g., "gas") or may include a non-dictionary string of characters (e.g., "asg"). In some implementations, a word may be a term. Alternatively, a word may be a subset of a term (e.g., a term may include multiple words). In some implementations, systems analysis platform 230 may determine words in the text by determining characters identified by one or more delimiting characters, such as a space, or a punctuation mark (e.g., a comma, a period, an exclamation point, or a question mark).

In some implementations, systems analysis platform 230 may generate a list of unique terms based on the tags. For example, the list of unique terms (e.g., a term corpus) may refer to a set of terms (e.g., single word terms or multi-word terms) extracted from the text. In some implementations, the term corpus may include terms tagged with a noun tag and/or a tag derived from a noun tag. Additionally, or alternatively, the term corpus may include terms identified based on input provided by a user (e.g., of client device 210), which may be tagged with a term tag, in some implementations. For example, the input may include input that identifies multi-word terms, input that identifies a pattern for identifying multi-word terms, such as a pattern of consecutive words associated with particular part-of-speech tags, or a pattern of terms appearing at least a threshold quantity of times in the text.

In some implementations, when generating the unique list of terms, systems analysis platform 230 may exclude terms associated with stop tags or stop terms (e.g., tags or terms that identify terms to be excluded from the unique list of terms). Additionally, or alternatively, systems analysis platform 230 may convert terms to a root form when adding the terms to the list of unique terms. For example, systems analysis platform 230 may convert the terms "process," "processing," "processed," and "processor" to the root form "process" and may add the term "process" to the unique list of terms. In some implementations, systems analysis platform 230 may store the unique list of terms (e.g., in a data structure or using memory resources). This conserves processor resources by reducing or eliminating the need for systems analysis platform 230 to reproduce the unique list of terms.

In some implementations, systems analysis platform 230 may receive a file that includes the first data. For example, systems analysis platform 230 may receive a text file, a comma-separated values (CSV) file, a spreadsheet file (e.g., a Microsoft Excel file), and/or the like, that includes the first data. In some implementations, systems analysis platform 230 may process a file that includes the first data to identify the first data (e.g., rather than processing text). In some implementations, systems analysis platform 230 may process multiple types of files to identify the first data.

In some implementations, systems analysis platform 230 may store first data. For example, systems analysis platform 230 may store the first data using a data structure and/or memory resources of systems analysis platform 230, such as in virtual storage 234-3. In some implementations, systems analysis platform 230 may aggregate the first data. For example, systems analysis platform 230 may aggregate the first data by aggregating the first data into a database, data structure, and/or the like. This conserves processing resources by permitting quick and efficient access to the first data. In addition, this permits processing and/or scalability that may not be possible using un-aggregated first data, or that may consume significant processing resources when using un-aggregated first data. Additionally, or alternatively, systems analysis platform 230 may de-duplicate the first data, merge the first data, normalize the first data, and/or the like. In this way, systems analysis platform 230 conserves memory resources of systems analysis platform 230, and/or conserves processing resources by enabling systems analysis platform 230 to quickly access the first data.

In some implementations, systems analysis platform 230 may aggregate different types of first data. For example, systems analysis platform 230 may aggregate first data related to different types of systems, different processes implemented by the set of systems, and/or the like. In some implementations, systems analysis platform 230 may aggregate first data based on a particular attribute of the first data. For example, systems analysis platform 230 may aggregate first data using an identifier that identifies a particular system included in the set of systems. In this way, systems analysis platform 230 may analyze first data based on one or more attributes of the first data, thereby improving analysis of the first data.

Additionally, or alternatively, systems analysis platform 230 may aggregate first data associated with different file types. For example, systems analysis platform 230 may aggregate first data associated with a spreadsheet file type, a text file type, a comma-separated values (CSV) file type, and/or the like. In some implementations, systems analysis platform 230 may format first data associated with different file types prior to, or in association with, aggregating the first data associated with the different file types. For example, systems analysis platform 230 may apply standard spacing to the first data, add or remove characters from the first data, separate a single column of first data into multiple columns of first data, and/or the like.

In some implementations, systems analysis platform 230 may aggregate and/or merge sets of first data using a big data analytics technique, tool, application, and/or software. For example, systems analysis platform 230 may aggregate or merge millions, billions, or trillions of data elements of first data. In some implementations, using big data analytics may enable systems analysis platform 230 to aggregate and/or merge sets of first data to identify previously unidentifiable relationships and/or trends among the first data. For example, using big data analytics may enable systems analysis platform 230 to merge and/or aggregate first data to identify/track a manner in which the set of systems affects implementation of the process.

This improves an accuracy of analyzing the first data by enabling systems analysis platform 230 to identify/track relationships among the first data. In addition, this enables systems analysis platform 230 to quickly and efficiently analyze a large quantity of first data, thereby conserving processing resources related to analyzing the first data.

In some implementations, systems analysis platform 230 may determine whether the first data is corrupted or whether a data element of the first data is missing from a set of first data. In this case, when systems analysis platform 230 determines that the first data is corrupted or that a data element of the first data is missing from the first data, systems analysis platform 230 may receive replacement first data to replace the missing or corrupted first data. For example, systems analysis platform 230 may receive the replacement first data based on information related to the missing or corrupted first data, based on querying external information source 220 for the missing or corrupted first data, based on cross-referencing the first data to determine the missing or corrupted first data, based on a user input to client device 210, and/or the like. This improves the first data used to analyze the set of systems, thereby improving an accuracy of the analysis and conserving processing resources of systems analysis platform 230.

In this way, systems analysis platform 230 may receive first data associated with a set of systems used to implement a process.

As further shown in FIG. 4, process 400 may include determining a system topology for the set of systems using the first data (block 420). For example, systems analysis platform 230 may determine a system topology for the set of systems. In some implementations, systems analysis platform 230 may determine the system topology using the first data.

In some implementations, the system topology may identify types and/or a quantity of systems used to implement a process. Additionally, or alternatively, the system topology may identify a manner in which systems are interconnected, a manner in which second data flows between systems of the set of systems, systems that are connected to client devices 210 (e.g., that permit user input), systems that are connected to other systems, and/or the like.

In some implementations, systems analysis platform 230 may determine the system topology based on processing the first data, as described above. In some implementations, systems analysis platform 230 may generate the system topology by identifying a term and/or tag (e.g., included in text). For example, for a consumer enrollment and broker reimbursement process, systems analysis platform 230 may identify the phrase "intake system sends data to member system" in first data to determine that a system topology includes an intake system and a member system and that the intake system is connected to the member system.

In some implementations, systems analysis platform 230 may determine the system topology based on testing the set of systems. For example, systems analysis platform 230 may generate and/or provide second data to a first system and may track the second data from the first system to other systems to determine the system topology. In some implementations, systems analysis platform 230 may receive first data that identifies a manner in which second data is processed by the set of systems, provided by the set of systems, received by the set of systems, and/or exchanged between the set of systems. In some implementations, systems analysis platform 230 may generate the system topology using the first data received by testing the set of systems. For example, systems analysis platform 230 may use the first data to determine a manner in which the set of systems provide and/or receive the second data, and may generate the system topology based on determining the manner in which the set of systems provide and/or receive the second data.

In some implementations, systems analysis platform 230 may identify a process flow of a process implemented by the set of systems. In some implementations, systems analysis platform 230 may identify a process flow of the process being implemented by the set of systems using a term and/or a tag in a manner similar to that described above with respect to determining the system topology. For example, for a consumer enrollment and broker reimbursement process, systems analysis platform 230 may identify the phrase "intake system sends second data to member system" to identify a process flow that includes sending second data from an intake system to a member system.

In some implementations, systems analysis platform 230 may identify process flows that are manual and process flows that are automatic. For example, systems analysis platform 230 may identify a manual process flow by identifying a particular term and/or tag, such as the phrase "I enter data into the intake system" in text of an interview, the phrase "user formats data for the member system" in text documentation, first data that identifies a step of a process that provides a set of instructions for display (e.g., indicating a portion of a process performed manually), and/or the like.

In some implementations, systems analysis platform 230 may store and/or provide information, for display, that identifies the system topology. For example, systems analysis platform 230 may generate a report that includes information identifying the system topology.

In this way, systems analysis platform 230 may determine a system topology for a set of systems using first data.

As further shown in FIG. 4, process 400 may include identifying a set of control points, associated with the set of systems, where second data is received and/or provided by the set of systems (block 430). For example, systems analysis platform 230 may identify a set of control points, associated with the set of systems, where second data is received and/or provided by the set of systems. In some implementations, systems analysis platform 230 may identify the set of control points using the received first data associated with the set of systems and/or the system topology determined for the set of systems.

In some implementations, the second data may include data processed, used, and/or stored by the set of systems when implementing a process. For example, the second data may include data received via client device 210, data analyzed to generate a report associated with the process, data stored by the set of systems during the process, and/or the like. For example, in a consumer enrollment and broker reimbursement process, second data may include data that a consumer inputs into a user interface to enroll in a health insurance plan, data identifying a reimbursement payment due to a broker, and/or the like.

In some implementations, a control point may include a point in a system topology, or a step in a process, where the second data is received by a system, provided by a system, and/or exchanged between systems. For example, and for a consumer enrollment and broker reimbursement process, the control point may include a point where the second data is sent from an intake system to a member system. Additionally, or alternatively, a control point may include a point in a system topology, or a point in a process, where second data is validated (e.g., for formatting), when a set of rules is applied to second data, and/or the like, such as when second data is received via user input and/or when second data is stored in a data structure. Additionally, or alternatively, a control point may include a point of connection between systems (e.g., where a first system is connected to a second system, where a first system is connected to client device 210, etc.).

In some implementations, systems analysis platform 230 may identify the set of control points based on processing the first data. In some implementations, systems analysis platform 230 may identify the set of control points using a set of terms identified in text. For example, systems analysis platform 230 may identify the phrase "Load data into member system using input interface" in the first data as identifying a control point where the second data is provided to a member system via a user interface (e.g., of client device 210).

Additionally, or alternatively, systems analysis platform 230 may identify the set of control points based on testing the set of systems. For example, and for a consumer enrollment and broker reimbursement process, systems analysis platform 230 may track second data that is input into an intake system to a broker payment system. In this case, systems analysis platform 230 may determine that there is at least one control point between the intake system and the broker payment system where second data is provided from the intake system to the broker payment system.

Additionally, or alternatively, systems analysis platform 230 may identify the set of control points by identifying points where a system can receive second data (e.g., either manually from a user of client device 210 or automatically). For example, systems analysis platform 230 may determine that an intake system can receive manual input via a user interface of the intake system and may identify the user interface as a control point for the intake system.

Additionally, or alternatively, systems analysis platform 230 may identify the set of control points based on the system topology. For example, the system topology may identify interconnection between systems of the set of systems, and systems analysis platform 230 may identify the set of control points where the systems interconnect.

Additionally, or alternatively, systems analysis platform 230 may identify the set of control points based on determining a process flow for the process implemented by the set of systems. For example, systems analysis platform 230 may identify the set of control points by identifying particular types of steps in the process flow of the process, such as where second data is validated by a system, loaded into a system, manipulated in a particular manner, combined from multiple systems, and/or the like.

In this way, systems analysis platform 230 may identify a set of control points where second data is received and/or provided by the set of systems.

As further shown in FIG. 4, process 400 may include identifying a set of values for a set of metrics related to the set of systems (block 440). For example, systems analysis platform 230 may identify a set of values for a set of metrics related to the set of systems.

In some implementations, the set of metrics may relate to performance of the set of systems, processes implemented by the set of systems, and/or the like. In some implementations, for a consumer enrollment and broker reimbursement process, the set of metrics may relate to an amount of time the systems take to process registration of a broker with a health insurance company, to process a broker sign up of a new member with a health plan, to associate a broker with an enrolled consumer, to compensate a broker for new consumer enrollments or consumer renewals, to provide support services (e.g., resolving inquiries, complaints, etc.) to a broker, and/or to provide performance management data (e.g., generating a performance report) regarding the performance of a broker.

Additionally, or alternatively, the set of metrics may include a percentage of processes or transactions completed by the set of systems, a quantity of error-free records stored by the set of systems, a quantity of records with errors stored by the set of systems, a quantity of issues reported by individuals who use the set of systems, an amount of time to perform a process, a quantity of duplicate records stored by the set of systems, and/or the like. For example, for a consumer enrollment and broker reimbursement process, the set of metrics may include a percentage of enrollments completed with a particular broker via a particular system, an amount of time to navigate, during the enrollment process, from one portion of a web-based enrollment interface to another portion of the web-based enrollment interface, a quantity or percentage of enrollments that did not generate an error, a quantity of inquiries from brokers, and/or a quantity of incorrect payments made to brokers due to enrollments with errors, due to system error, due to incorrectly formatted second data, and/or the like.

Additionally, or alternatively, for a consumer enrollment and broker reimbursement process, the set of metrics may include a quantity and type of issues preventing or delaying member sign up (e.g., systems crashes, failure of a user interface to accept input second data, acceptance of incorrectly formatted second data, etc.), an indication of timely generation of new sales reports (e.g., based on a schedule of when the reports are to be generated), or a quantity of new enrollment applications missing broker information.

Additionally, or alternatively, for a consumer enrollment and broker reimbursement process, the set of metrics may include metrics associated with matching a broker with an enrollment of a consumer in a health plan. For example, the set of metrics may include a quantity of consumer-broker matches created without errors (e.g., errors where information identifying a broker that is input during enrollment does not match information stored by the set of systems), or a quantity of brokered enrollments at intake relative to a quantity of brokered enrollment in a payment system.

Additionally, or alternatively, for a consumer enrollment and broker reimbursement process, the set of metrics may include metrics associated with compensating a broker for new business or renewals. For example, the set of metrics may include a percentage of payments made on time (e.g., made by a particular date), a quantity of correct payments (e.g., payments where the quantity of enrollments for which a broker is compensated matches a quantity of enrollments associated with the broker), a quantity of payment inquiries from a broker (e.g., broker complaints, disputes, etc.), and/or the like.

Additionally, or alternatively, the set of metrics may include metrics associated with providing support services (e.g., resolving inquiries, complaints, etc.) to a broker. For example, and for a consumer enrollment and broker reimbursement process, the set of metrics may include an average wait time for calls to a broker support call center, a percentage of broker inquiries resolved in one call, a quantity of calls per 100 brokers per month, or a percentage of repeat calls.

Additionally, or alternatively, for a consumer enrollment and broker reimbursement process, the set of metrics may include metrics associated with performance management of brokers. For example, the set of metrics may include a quantity of new enrollments generated by a broker during a particular time period or an indication of profitability of a broker.

In some implementations, systems analysis platform 230 may identify a set of values for the set of metrics based on comparing second data among systems of the set of systems. For example, for a consumer enrollment and broker reimbursement process, systems analysis platform 230 may compare information identifying a quantity of enrollments associated with a particular broker received by an intake system and information identifying a quantity of sign-ups for which the broker was reimbursed via a broker payment system to identify data loss or data leakage between the intake system and the broker payment system.

In some implementations, systems analysis platform 230 may identify a set of values for the set of metrics based on output from the set of systems. For example, systems analysis platform 230 may identify the set of values by determining a quantity of errors generated by the set of systems, using information included in a report generated by the set of systems, and/or the like.

Additionally, or alternatively, systems analysis platform 230 may identify the set of values for the set of metrics based on monitoring the set of systems. For example, systems analysis platform 230 may identify a value for an amount of time the set of systems takes to perform a process (e.g., generate a broker reimbursement payment after a consumer enrolls in a health plan) by monitoring the set of systems from a particular consumer's enrollment to when a broker reimbursement payment related to the consumer's enrollment is generated.

Additionally, or alternatively, systems analysis platform 230 may identify the metric based on processing the first data as described above. For example, systems analysis platform 230 may identify a value for a metric based on processing text associated with an interview of a user of the set of systems (e.g., by identifying a term and/or a tag), answers to a questionnaire related to a user's experience with the set of system, and/or the like.

In this way, systems analysis platform 230 may identify a set of values for a set of metrics related to the set of systems.

As further shown in FIG. 4, process 400 may include identifying an error related to the set of control points and/or the set of metrics based on identifying the set of control points and/or the set of values for the set of metrics (block 450). For example, systems analysis platform 230 may identify an error related to the set of control points and/or the set of metrics. In some implementations, systems analysis platform 230 may identify the error based on identifying the set of control points and/or the set of values for the set of metrics.

In some implementations, an error may negatively impact a set of systems. For example, the error may decrease an efficiency of the set of systems, cause the systems to perform duplicate/unneeded actions, thereby consuming processing resources, increase an amount of time for the set of systems to complete a process, generate inaccurate output, and/or the like.

In some implementations, systems analysis platform 230 may identify an error based on comparing the set of values and a set of threshold values. For example, systems analysis platform 230 may compare a processing time of the set of systems and a threshold processing time and determine whether the processing time satisfies the threshold. In this way, systems analysis platform 230 may identify an error using a set of threshold values.

In some implementations, systems analysis platform 230 may identify an error for a first value based on whether a second value has an error (e.g., satisfies a threshold value). In other words, identifying an error for the first value may be dependent on identifying an error for a second value. In this way, systems analysis platform 230 may identify an error with a first value that depends on a second value.

Additionally, or alternatively, systems analysis platform 230 may identify an error based on analysis of another set of systems (e.g., associated with the same organization or with another organization). In some implementations, systems analysis platform 230 may compare a first set of values for a first set of systems and a second set of values for a second set of systems (e.g., for which an error was previously identified) and determine whether the first set of values satisfies the second set of values, is within a threshold percentage or amount of the second set of values, and/or the like. In this way, systems analysis platform 230 may use first data from a first analysis to identify an error during a second analysis.

In some implementations, systems analysis platform 230 may identify an error when systems analysis platform 230 identifies a similar pattern of values between a first set of values and a second set of values (e.g., from another analysis of the same set of systems, of a different set of systems, etc.) using artificial intelligence, data mining, machine learning, and/or the like. In this way, systems analysis platform 230 may identify an error for a first set of values by identifying a similar pattern of values in a second set of values.

Additionally, or alternatively, systems analysis platform 230 may identify an error based on a term and/or a tag identified from text. In some implementations, systems analysis platform 230 may identify a first tag or a first term included in text that identifies a value for a metric (e.g., may identify the phrases "40 seconds" and "processing time" as identifying that the processing time of the set of systems is 40 seconds).

In some implementations, systems analysis platform 230 may identify a second tag or term associated with the first tag or first term. For example, systems analysis platform 230 may identify a first term, such as "slow," "fast," "inadequate," "great," etc., associated with a phrase, such as "processing time," to identify an error related to processing time of the set of systems (e.g., based on the sentiment of the first term, as described below). In some implementations, when identifying a first term and a second term to identify an error, systems analysis platform 230 may identify the second term in the same text as the first term, adjacent to the first term in the same text as the first term, a threshold quantity of terms from the first term in the same text, in a different text than the first term (e.g., a text referenced by the text that includes the first term), and/or the like. In this way, systems analysis platform 230 may identify an error by identifying terms in text.

In some implementations, systems analysis platform 230 may perform a sentiment analysis on a term included in text to determine a positive or negative sentiment of the term (e.g., to permit systems analysis platform 230 to identify an error). For example, systems analysis platform 230 may use a data structure that includes information identifying terms and corresponding sentiments to determine the sentiment of a term identified in text. In some implementations, systems analysis platform 230 may identify an error where the term is associated with a negative sentiment. In this way, systems analysis platform 230 may identify an error based on a sentiment of a term included in text.

Additionally, or alternatively, systems analysis platform 230 may identify an error based on a response to a questionnaire or a survey. For example, assuming that a questionnaire permits a user to respond on a scale from one to five, systems analysis platform 230 may identify an error where a question does not receive at least a particular score, does not receive a threshold average score when scores from multiple individuals who complete the questionnaire are aggregated, and/or the like. As another example, systems analysis platform 230 may identify a term included in a response to a questionnaire to identify an error (e.g., similar to that described above). In this way, systems analysis platform 230 may identify an error using a response to a questionnaire or a survey.

Additionally, or alternatively, systems analysis platform 230 may identify an error when a process flow of the process implemented by the set of systems does not match a set of rules identified by processing the first data. For example, assume that systems analysis platform 230 has processed a specification document for the set of systems (e.g., using natural language processing, text analysis, etc.) and has identified a rule that second data input into the set of systems has to be formatted in a particular manner by identifying a term, a phrase, and/or the like in the text of the specification document. Continuing with the previous example, systems analysis platform 230 may identify an error where the set of systems permits input of second data in formats different than that specified by the specification document (e.g., as determined by testing the set of systems, monitoring the set of systems, and/or the like, as described above).

Additionally, or alternatively, systems analysis platform 230 may identify an error by determining that there is a missing control point between two systems. For example, and for a consumer enrollment and broker reimbursement process, assume that systems analysis platform 230 has processed a specification document and determined that the set of systems is to include a control point where second data identifying a quantity of enrollments for which the broker is to be reimbursed matches a quantity of enrollments associated with the broker received by the set of systems prior to generating a reimbursement payment (e.g., to identify data loss or data leakage, to reduce a quantity of incorrect payments, etc.). Continuing with the previous example, systems analysis platform 230 may identify an error by determining that the set of systems do not implement such validation by testing the system, monitoring the set of systems, and/or the like. In this way, systems analysis platform 230 may identify an error by identifying a missing control point.

Additionally, or alternatively, systems analysis platform 230 may identify an error by determining that a control point is an improperly functioning control point. For example, assume that systems analysis platform 230 determines that a requirements document for a system specifies that the system is to restrict a date input via a user interface of the system to a particular format (e.g., using natural language processing, text analysis, etc.). Continuing with the previous example, assume that systems analysis platform 230 determines that the particular system checks the formatting of a date input via a user interface, but does not prevent other formatted dates from being input (e.g., via testing of the particular system). In this case, systems analysis platform 230 may determine that a control point implemented to check formatting of a date input to a system is not properly functioning. In this way, systems analysis platform 230 may identify an error by identifying an improperly functioning control point.

Additionally, or alternatively, systems analysis platform 230 may identify an error based on a manner in which the set of systems permit manipulation of stored second data. For example, if multiple systems store the same information (e.g., consumer information or broker information), systems analysis platform 230 may identify an error when systems analysis platform 230 determines that each of the multiple systems permits manipulation of the stored second data (e.g., as this may result in second data being inconsistently stored across the set of systems). In this way, systems analysis platform 230 may identify an error based on a manner in which the set of systems permit manipulation of stored second data.

Additionally, or alternatively, systems analysis platform 230 may identify an error using information identifying a manner in which second data is mapped. For example, for a consumer enrollment and broker reimbursement process, systems analysis platform 230 may determine that second data input into an upstream system, such as an intake system, is incorrectly mapped to data structure fields of a data structure used by a downstream system, such as a broker reimbursement system. In this way, systems analysis platform 230 may identify an error based on a mapping of second data used by the set of systems.

In some implementations, systems analysis platform 230 may create a model using machine learning (e.g., to analyze first data received from the set of systems). For example, systems analysis platform 230 may create a model using a training set of first data that includes first data related to another set of systems, another analysis of the same set of systems, and/or the like. In some implementations, systems analysis platform 230 may input first data associated with the set of systems being analyzed into the model (e.g., to analyze the set of systems). In some implementations, systems analysis platform 230 may identify an error related to the set of systems based on outputs from the model.

In some implementations, systems analysis platform 230 may determine a severity for an identified error (e.g., a high, medium, or low severity). In some implementations, the severity of the error may be based on an amount of time needed to fix the error (e.g., as determined using information from other analyses that identified similar errors), a quantity of systems affected by the error, whether manual action is needed to fix the error (e.g., as determined based on a recommendation to facilitate fixing the error generated by systems analysis platform 230 or based on information from another analysis), whether the error affects an upstream system (e.g., a system associated with an earlier portion of a process relative to another system), a severity of a similar error identified in another analysis, and/or the like. In some implementations, systems analysis platform 230 may determine a priority for fixing the error relative to other errors based on the severity of the error. In this way, systems analysis platform 230 may determine a severity of an error and may determine a priority for fixing the error based on the severity, thereby optimizing improvement of the set of systems.

In this way, systems analysis platform 230 may identify an error related to the set of control points and/or the set of metrics.

As further shown in FIG. 4, process 400 may include performing an action to facilitate fixing of the error based on identifying the error (block 460). For example, systems analysis platform 230 may perform an action to facilitate fixing of the error. In some implementations, systems analysis platform 230 may perform the action based on identifying the error.

In some implementations, systems analysis platform 230 may generate a recommendation. For example, systems analysis platform 230 may generate a recommendation to implement a control point to fix an error. Continuing with the previous example, systems analysis platform 230 may generate a recommendation to check formatting of second data, or to implement validation of second data, before the second data is provided from a first system to a second system. As another example, when systems analysis platform 230 identifies an error based on the manner in which the set of systems permit manipulation of second data stored by the set of systems, systems analysis platform 230 may generate a recommendation to restrict manipulation of second data stored by the set of systems to one particular system, and have the particular system update the records of the other systems that use the second data, thereby reducing or eliminating inconsistently stored second data across the set of systems.

Additionally, or alternatively, systems analysis platform 230 may generate a report that includes information identifying the error and/or a recommendation generated to facilitate fixing of the error. For example, systems analysis platform 230 may generate a report identifying the error as a mission control point between two systems and a generated recommendation to facilitate fixing the error. In some implementations, systems analysis platform 230 may provide the report for display (e.g., by providing the report to client device 210).

Additionally, or alternatively, systems analysis platform 230 may schedule a meeting among individuals associated with the organization, such as to discuss the error and/or a generated recommendation. For example, systems analysis platform 230 may use electronic calendars associated with the individuals to identify an available time for the meeting, and may send a meeting request to the individuals via email.

Additionally, or alternatively, systems analysis platform 230 may send a message (e.g., an email, a short message services (SMS) message, or a multimedia messaging service (MMS) message) to client device 210. For example, systems analysis platform 230 may send a message to client device 210 of an information technology (IT) professional (e.g., to provide the IT professional with information related to fixing the error), a systems administrator, and/or the like.

Additionally, or alternatively, systems analysis platform 230 may add first data related to the error to a repository of first data (e.g., that includes first data from other analyses of the same set of systems or another set of systems), such as to facilitate machine learning using the first data. In this way, systems analysis platform 230 may improve a future analysis of a set of systems via improved accuracy of the analysis and/or reduced time for performing the analysis.

Additionally, or alternatively, systems analysis platform 230 may provide first data to another systems analysis platform 230 to permit the other systems analysis platform 230 to perform an analysis of another set of systems. In this way, systems analysis platform 230 improves an analysis performed by the other systems analysis platform 230 and conserves processing resources of the other systems analysis platform 230 by enabling quick and efficient analysis. Additionally, or alternatively, systems analysis platform 230 may use the first data to identify an error with another set of systems (e.g., via pattern recognition, artificial intelligence, machine learning, etc.). In this way, systems analysis platform 230 improves an analysis of another set of systems.

In some implementations, systems analysis platform 230 may use artificial intelligence to identify a set of actions to perform based on the identified error. In some implementations, systems analysis platform 230 may generate a corresponding likelihood of success or predicted impact of the set of actions. For example, systems analysis platform 230 may train the artificial intelligence on first data related to another analysis of the same, or a different, set of systems and information identifying actions performed based on the other analysis. Continuing with the previous example, systems analysis platform 230 may train the artificial intelligence on information identifying a result of performing the action (e.g., whether the action facilitated fixing the error). This improves performance of an action by systems analysis platform 230.

In some implementations, systems analysis platform 230 may identify a particular system (associated with one or more steps in a process) on which to perform an action, when the action could be performed on multiple systems. For example, systems analysis platform 230 may identify a first system associated with an earlier step in a process, relative to a second system associated with a later step of the process, on which to perform the action. This reduces errors associated with the set of systems by having systems analysis platform 230 facilitate fixing of errors on systems associated with earlier steps in a process (e.g., so that error-containing second data is not provided to a system associated with a step later in the process). In addition, this conserves processing resources of systems analysis platform 230 by reducing a quantity of times systems analysis platform 230 has to perform an action to fix the same error with multiple systems.

In some implementations, when performing an action, systems analysis platform 230 may perform an analysis of a set of control points associated with the set of systems, or that systems analysis platform 230 has determined are needed for the set of systems. In some implementations, systems analysis platform 230 may analyze the set of control points to determine an optimal configuration of control points to fix identified errors related to the set of systems. For example, assume that systems analysis platform 230 determines that three systems are missing control points to validate formatting of second data exchanged between the systems. Continuing with the previous example, assume that systems analysis platform 230 identifies one of the systems as the system that initially receives the second data. In this case, systems analysis platform 230 may determine that implementing formatting validation for the system that receives the second data may eliminate the need for implementing formatting validation on the other two systems missing control points.

As another example, systems analysis platform 230 may incrementally recommend, or perform an action to implement, various control points, so as to permit testing of each control point, so as to determine a minimum configuration of control points needed to correct identified errors. Continuing with the previous example, in some implementations, systems analysis platform 230 may generate a recommendation to implement multiple control points to fix an error. In some implementations, systems analysis platform 230 may perform a first action to implement a first control point, and may perform a test of the first control point to determine whether the first control point positively impacts the error, or positively impacts the error by a threshold amount.

In some implementations, if systems analysis platform 230 determines that the implemented control point positively impacts the error, or positively impacts the error by a threshold amount, systems analysis platform 230 may determine that no additional actions need to be performed. This conserves processing resources of systems analysis platform 230 by reducing or eliminating a need for systems analysis platform 230 to perform additional actions to implement other control points. Conversely, if systems analysis platform 230 determines that implementing the control point fails to positively impact the error, or fails to positively impact by a threshold amount, then systems analysis platform 230 may perform a second action to implement a second control point, and may perform a second test to determine whether the second control point positively impacts the error, or impacts the error by a threshold amount.

In this way, systems analysis platform 230 may determine an optimal configuration of control points to fix an identified error. In addition, this minimizes disruption to the set of systems by reducing a quantity of changes to the set of systems that may be needed to fix an error and conserves processing resources related to fixing the error.

In some implementations, systems analysis platform 230 may test the set of systems. For example, systems analysis platform 230 may test the set of systems after performing the action to determine an effect of performing the action (e.g., to determine whether the action fixed the error, reduced the error, positively impacted the error, etc.). In some implementations, when testing the set of systems, systems analysis platform 230 may perform an integrated test, similar to that described above. This improves testing of the set of systems and improves determination of an effect of performing an action to facilitate fixing of an error related to the set of systems.

In some implementations, the action may positively impact an error. For example, performing the action may result in reducing an amount of time for a set of systems to complete a process, reducing or eliminating duplicate/unnecessary actions performed by the set of systems, reducing errors by the set of systems, and/or the like.

In this way, systems analysis platform 230 may perform an action to facilitate fixing of an error based on identifying the error.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Although the implementations described herein may use a consumer enrollment and broker reimbursement process to illustrate various examples, the implementations may apply to other types of processes, including processes outside of the healthcare/insurance context that are implemented using a set of systems. For example, the implementations may be used to analyze a set of systems that implement a financial/banking process, a software development process, or a manufacturing process.

Implementations described herein enable a systems analysis platform to generate a system topology used to implement a process. Furthermore, implementations described herein enable a systems analysis platform to identify sources of data loss, data leakage, or other issues that have occurred, or might occur, during implementation of the process. Furthermore, implementations described herein enable a systems analysis platform to generate a recommendation and/or perform another action to improve the process.

In this way, the systems analysis platform increases an efficiency of analyzing a process of an organization, thereby conserving processing resources via quick and efficient analysis of systems used to implement the process. In addition, in this way, the systems analysis platform improves accuracy of a result/output of a process, thereby conserving processing resources that would otherwise be consumed due to inaccurate results/outputs. Furthermore, in this way, the systems analysis platform improves data communicated between systems, thereby conserving processing resources of the systems that would otherwise be consumed as a result of damaged, corrupted, or incorrect data.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more processors to:
   receive first data associated with a set of systems used to implement a process,
   the first data including information related to an operation or a performance of the set of systems;
   determine a system topology for the set of systems based on receiving the first data;
   identify a set of control points associated with the set of systems based on determining the system topology,
   the set of control points including a set of points in the system topology where second data is received or provided by the set of systems,
   the second data including information to be used by the set of systems during the process;
   identify a set of values for a set of metrics related to the set of systems based on identifying the set of control points,
   the set of values being identified based on the first data;
   identify an error related to the set of control points or the set of metrics based on identifying the set of control points or the set of values; and
   perform an action to facilitate fixing of the error based on identifying the error.

2. The device of claim 1, where the one or more processors are further to:
   perform a test of the set of systems prior to receiving the first data; and
   where the one or more processors, when receiving the first data, are to:
   receive the first data based on performing the test of the set of systems.

3. The device of claim 1, where the one or more processors are further to:
   identify a quantity or a type of systems included in the set of systems based on the first data;
   identify a manner in which the set of systems are interconnected after identifying the quantity or the type of systems; and
   where the one or more processors, when determining the system topology, are to:
   determine the system topology based on identifying the manner in which the set of systems are interconnected.

4. The device of claim 1, where the one or more processors are further to:
   process the first data based on receiving the first data,
   processing the first data including using at least one of:
   natural language processing,
   text analysis, or
   computational linguistics;
   identify a term or a tag included in the first data based on processing the first data; and
   where the one or more processors, when generating the system topology, are to:
   generate the system topology based on the term or the tag.

5. The device of claim 1, where the one or more processors are further to:
   perform a test of the set of systems using the second data; and
   where the one or more processors, when identifying the set of control points, are to:
   identify the set of control points based on performing the test of the set of systems.

6. The device of claim 1, where the one or more processors are further to:
   process the first data based on receiving the first data;
   identify a point, of the set of points, in the system topology where the second data is to be received via a user interface associated with a system, of the set of systems, based on processing the first data; and where the one or more processors, when identifying the set of control points, are to:
identify the set of control points based on identifying the point in the system topology where the second data is received via the user interface.

7. The device of claim 1, where the one or more processors, when performing the action, are to:
identify a particular system, of the set of systems, on which to perform the action based on identifying the error; and where the one or more processors, when performing the action, are to:
perform the action based on identifying the particular system.

8. A method, comprising:
receiving, by a device, first data associated with multiple systems used to implement a process,
the first data being received from the multiple systems or from another device associated with the multiple systems;
storing, by the device, the first data in one or more storage devices associated with the device;
determining, by the device, a system topology for the multiple systems based on storing the first data,
the system topology identifying:
a quantity of systems included in the multiple systems,
a type of the systems included in the multiple systems, or
a manner in which the multiple systems are interconnected;
identifying, by the device, multiple control points associated with the multiple systems based on determining the system topology,
the multiple control points including points of connection among the multiple systems;
identifying, by the device, multiple values for multiple metrics related to the multiple systems based on identifying the multiple control points,
the multiple values being identified based on the first data;
identifying, by the device, multiple errors related to the multiple control points or the multiple metrics based on identifying the multiple control points or the multiple values; and
performing, by the device, multiple actions to facilitate fixing of the multiple errors based on identifying the multiple errors.

9. The method of claim 8, further comprising:
generating second data to be input into the multiple systems prior to receiving the first data;
inputting the second data into the multiple systems based on generating the second data;
determining a manner in which the multiple systems processed the second data based on inputting the second data into the multiple systems; and
where receiving the first data comprises:
receiving the first data based on determining the manner in which the multiple systems processed the second data.

10. The method of claim 8, further comprising:
generating second data prior to determining the system topology;
providing the second data to a system, of the multiple systems, based on generating the second data;

determining a manner in which the second data is provided or received by the multiple systems based on providing the second data to the system; and
where determining the system topology comprises:
determining the system topology based on determining the manner in which the second data is provided or received by the multiple systems.

11. The method of claim 8, further comprising:
processing text to identify a term or a tag based on receiving the first data,
the first data including the text,
the term or the tag identifying a control point, of the multiple control points; and
where identifying the multiple control points comprises:
identifying the multiple control points based on processing the text.

12. The method of claim 8, where performing the multiple actions comprises:
sending a message to another device based on identifying the multiple errors,
the message including information identifying the multiple errors or identifying a recommendation to facilitate fixing of the multiple errors.

13. The method of claim 8, where the first data includes:
information related to the quantity of systems included in the multiple systems,
the type of the systems included in the multiple systems,
the manner in which the multiple systems are interconnected,
output from the multiple systems related to an operation or a performance of the multiple systems, or
text related to the multiple systems.

14. The method of claim 8, where the multiple errors include one or more of:
a missing control point,
an improperly functioning control point,
a first value, of the multiple values, that does not satisfy a threshold value, or
a second value, of the multiple values, that satisfies the threshold value.

15. A non-transitory computer-readable medium storing instructions, the instructions comprising:
one or more instructions that, when executed by one or more processors, cause the one or more processors to:
receive first data associated with one or more systems used to implement one or more processes,
the first data being received from the one or more systems;
determine a system topology for the one or more systems based on the first data;
identify one or more control points associated with the one or more systems based on determining the system topology,
the one or more control points being associated with second data to be used by the one or more systems when implementing the one or more processes;
identify one or more values for one or more metrics related to the one or more systems based on identifying the one or more control points,
the one or more values being identified based on the first data;
identify one or more errors related to the one or more control points or the one or more metrics based on identifying the one or more control points or the one or more values, the one or more errors negatively impacting an operation or a performance of the one or more systems; and perform one or more actions to positively impact the one or more errors based on identifying the one or more errors.

16. The non-transitory computer-readable medium of claim 15, where the one or more instructions, when executed by the one or more processors, further cause the one or more processors to:

generate the second data according to one or more formats based on identifying the one or more control points;

input the second data into the one or more systems based on generating the second data;

determine a manner in which the one or more systems processed the second data based on inputting the second data into the one or more systems, the manner being determined from the first data; and where the one or more instructions, that cause the one or more processors to identify the one or more errors, cause the one or more processors to:

identify the one or more errors based on determining the manner in which the one or more systems process the second data.

17. The non-transitory computer-readable medium of claim 15, where the one or more instructions, when executed by the one or more processors, further cause the one or more processors to:

process the first data based on receiving the first data;

identify one or more process flows for the one or more processes based on processing the first data; and where the one or more instructions, that cause the one or more processors to determine the system topology, cause the one or more processors to:

determine the system topology based on identifying the one or more process flows for the one or more processes.

18. The non-transitory computer-readable medium of claim 15, where the one or more instructions, when executed by the one or more processors, further cause the one or more processors to:

process the first data based on receiving the first data;

determine that the one or more systems permit manipulation of the second data at one or more points in the system topology; and where the one or more instructions, that cause the one or more processors to identify the one or more errors, further cause the one or more processors to:

identify the one or more errors based on determining that the one or more systems permit manipulation of the second data at the one or more points in the system topology.

19. The non-transitory computer-readable medium of claim 15, where the one or more instructions, when executed by the one or more processors, further cause the one or more processors to:

identify a particular system, of the one or more systems, causing the one or more errors based on identifying the one or more errors; and where the one or more instructions, that cause the one or more processors to perform, the one or more actions, cause the one or more processors to:

perform the one or more actions based on identifying the particular system.

20. The non-transitory computer-readable medium of claim 15, where the one or more instructions, that cause the one or more processors to perform the one or more actions, further cause the one or more processors to:

generate a recommendation to implement multiple control points to facilitate fixing the one or more errors based on identifying the one or more errors;

perform a first action, of the one or more actions, to implement a first control point, of the multiple control points, based on generating the recommendation;

perform a test of the first control point based on performing the first action;

determine whether implementation of the first control point positively impacted the one or more errors based on performing the test; and perform a second action, of the one or more actions, to implement a second control point, of the multiple control points, based on determining that implementation of the first control point failed to positively impact the one or more errors.

* * * * *